April 3, 1956  M. J. ECKROAD  2,740,639
VERTICALLY ADJUSTABLE TRAILER SUSPENSION
Filed Jan. 7, 1954  2 Sheets-Sheet 1

INVENTOR.
Maurice J. Eckroad
BY
Frease & Bishop
ATTORNEYS

April 3, 1956  M. J. ECKROAD  2,740,639
VERTICALLY ADJUSTABLE TRAILER SUSPENSION
Filed Jan. 7, 1954  2 Sheets-Sheet 2

INVENTOR.
Maurice J. Eckroad
BY
Frease & Bishop
ATTORNEYS

United States Patent Office 2,740,639
Patented Apr. 3, 1956

2,740,639

VERTICALLY ADJUSTABLE TRAILER SUSPENSION

Maurice J. Eckroad, Navarre, Ohio

Application January 7, 1954, Serial No. 402,650

9 Claims. (Cl. 280—43)

This invention relates to a vehicle construction and more specifically it pertains to an improvement in a suspension mechanism for trailer or truck frames.

In the past most trailers have been difficult for the average person to use because the trailer frames or beds have been too high for easy loading or unloading. This has been particularly true with respect to trailers for hauling boats which are usually heavy and cumbersome objects. Accordingly, various types of trailers have been developed, including trailers which must be disconnected from a towing vehicle in order to lower the rear end of the frame by raising the front end.

Other trailers have been developed with a crank axle that permits vertical movement of the frame without disconnecting from the towing vehicle. However, such axles have been limited in the arc through which they are rotated either due to the type of spring suspension or to interference with the trailer frame or load.

One object of this invention is to provide a trailer frame that may be raised or lowered for loading and unloading purposes.

Another object of this invention is to provide a vehicle frame having a crank axle which may be rotated about a 360° arc with respect to the wheel centers, and thereby shift a load to either the front or the rear of the wheel centers as desired, thereby shifting more or less weight to the towing vehicle.

Another object is to provide a flexible mounting for the axle that is double-acting in order to produce a smooth ride.

Another object is to provide the foregoing objects with a trailer that is simple and inexpensive to manufacture.

These and other objects and advantages apparent to those skilled in the art from the following description and claims may be attained, the stated results achieved, and the described difficulties overcome, by the discoveries, principles, apparatus, parts, combinations, subcombinations and elements which comprise the present invention, the nature of which is set forth in the following general statement, the preferred embodiments of which—illustrative of the best modes in which the applicant has contemplated applying the principles—are set forth in the following description, and which are particularly and distinctly pointed out and set forth in the appended claims forming part hereof.

The nature of the improvements in the trailer construction of the present invention may be stated in general terms as preferably including an elongated trailer frame having at least one crank axle rotatably mounted on the frame which axle is provided with aligned offset wheel-supporting end portions or stub shafts, connecting rods journally mounted respectively at one end to each of said stub shafts, resilient suspension means releasably mounted on the frame at a location longitudinally spaced from the axle, said means including a pair of springs longitudinally mounted with respect to the frame, the other ends of the connecting rods being secured to said means, and locking means for releasably mounting said suspension means to the frame at desired intervals with respect thereto.

By way of example, preferred embodiments of the improved trailer construction are illustrated in the accompanying drawings forming a part hereof, wherein.

Figure 1:
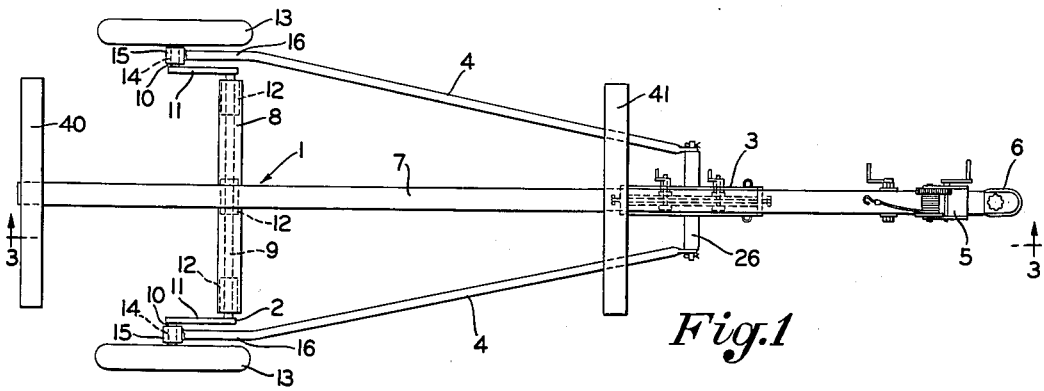
Fig. 1 is a plan view of the device of this invention showing a single crank axle having wheels disposed behind the axle mounting on the frame.
Figure 2:
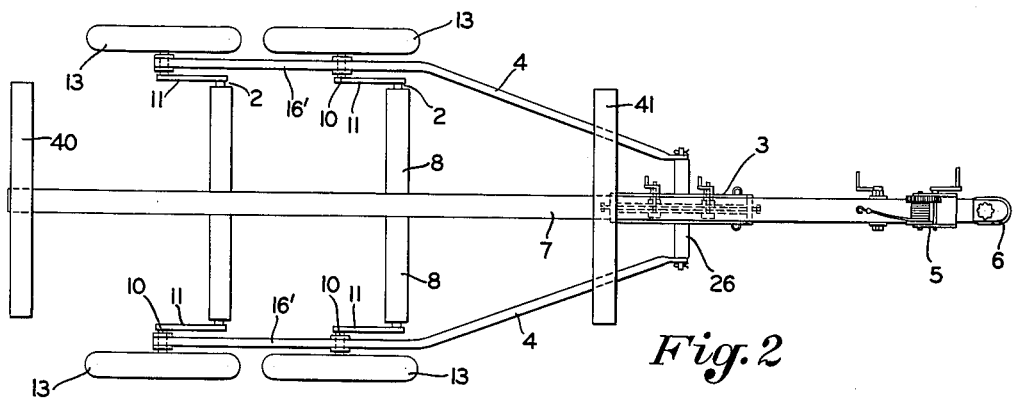
Fig. 2 is a plan view showing a pair of crank axles disposed in a manner similar to that in Fig. 1.

In Fig. 1, one embodiment of this invention is shown. It includes a trailer frame, generally indicated at 1, a crank axle 2, a resilient means or suspension mechanism 3, a pair of radius or connecting rods 4, a winch 5, and a socket 6 by which the trailer may be attached to a complementary ball on a towing vehicle.

The trailer frame 1 consists of a tongue-member 7 which is centrally disposed along the longitudinal axis of the assembly. In addition, the frame 1 includes a cross-member 8, the center of which is rigidly secured to the tongue-member 7 at a distance spaced from the left end of the tongue-member as shown in Fig. 1. The tongue-member 7 and cross-member 8 are preferably composed of I-beams. It is understood that the foregoing description of the trailer frame 1 constitutes but one form; and other forms may be readily adapted which include more than the two frame members 7 and 8 just described.

The crank axle 2 includes a shaft portion 9 which constitutes the majority of the length thereof, a pair of offset end portions or stub shafts 10, and a pair of cantilever portions 11. The shaft portion 9 is journally mounted to the undersurface of the cross-member 8 at journals 12. In this manner the axle is normally mounted on the trailer frame so that the end portions 10 are disposed in an axis perpendicular to the tongue-member 7. The outer exsuch case the bolt and nut assembly may be inserted into the newly registered aperture 38 and the assembly may be tightened as set forth above.

Figure 4:
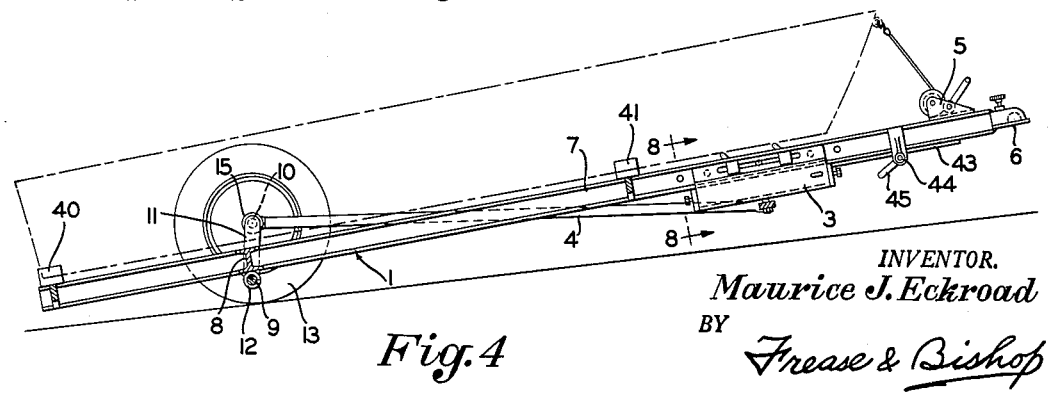
Fig. 4 is a vertical sectional view taken on a plane similar to that of Fig. 3, showing the trailer frame at its lowermost position, the axle mounting being below the center of the wheel, and showing the manner in which the trailer may be inclined for loading and unloading purposes.
Figure 6:
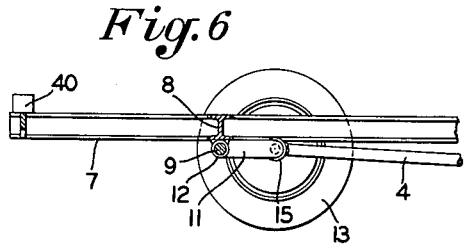
Fig. 6 is a fragmentary, vertical, sectional view, partly in elevation, showing the axle mounting on the side of the center of the wheel opposite that shown in Fig. 3.
Figure 8:
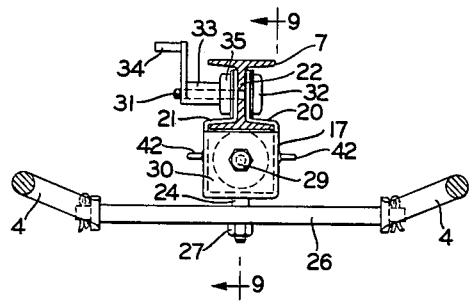
Fig. 8 is a transverse sectional view, taken on the line 8—8 of Fig. 4, showing the manner in which the resilient suspension mechanism is attached to the trailer frame, and the manner in which the connecting or radius rods are attached to said mechanism.
Figure 7:
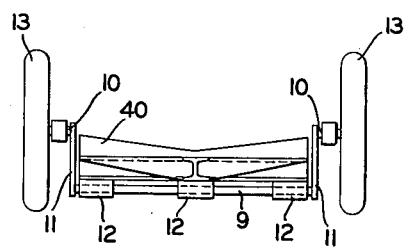
Fig. 7 is an end view of the trailer showing the axle mounting at its lowermost position which position is shown in Fig. 4.
Figure 9:
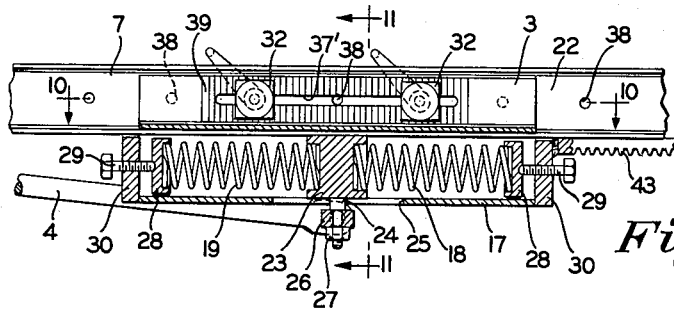
Fig. 9 is a vertical sectional view, partly in elevation, taken on the line 9—9 of Fig. 8, showing the interior of the resilient suspension mechanism which is slidably mounted on the trailer frame and by which the loaded trailer is given spring suspension.
Figure 10:
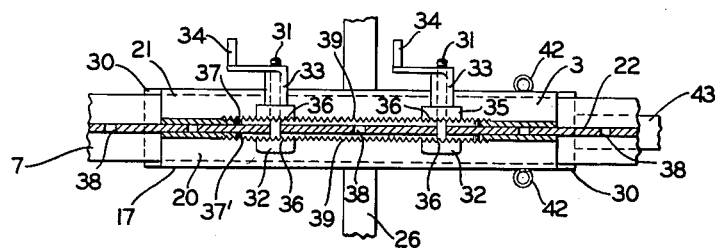
Fig. 10 is a horizontal sectional view, taken on the line 10—10 of Fig. 9, showing one manner by which the suspension mechanism may be releasably secured to the frame.
Figure 11:
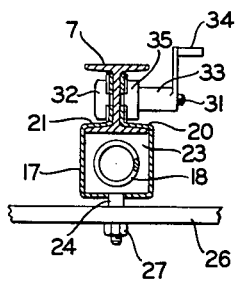
Fig. 11 is a vertical sectional view, taken on the line 11—11 of Fig. 9, showing one crank nut and bolt by which the suspension mechanism may be easily attached and released from the trailer frame.

The winch 5 may be used for two purposes. First, it may be used for loading the trailer, as when the trailer is used for hauling boats. If the trailer is to be used exclusively for this purpose, it may be provided with a pair of boat saddles 40 and 41 appropriately spaced and attached to the tongue-member 7. Secondly, after the trailer is loaded, the end of the cable of the winch 5 may be attached to one of two eyes 42 attached to the forward end of the housing 17 of the suspension mechanism 3. With the suspension mechanism 3 unlocked with respect to the tongue-member 7, the slack may be taken up in the cable by the winch 5. This causes the tongue-member 7 to move leftwardly, as shown in Fig. 4, with respect to the suspension mechanism 3 until the axle shaft 9 is disposed to the left of the wheel center as shown in Fig. 6. During this operation the connecting rods 4 maintain the spacing between the suspension mechanism 3 and the center of the wheels 13 and as the winch 5 is tightened the winch is drawn towards the suspension mechanism because the winch being secured to the tongue-member 7. Upon completion of this operation the locking nuts 33 may be tightened into place, thereby preventing shifting of the tongue-member 7 with respect to the mechanism 3 upon release of the cable from the eye 42. The cable may then be attached to the forward end of a boat as shown in Fig. 4.

Figure 3:
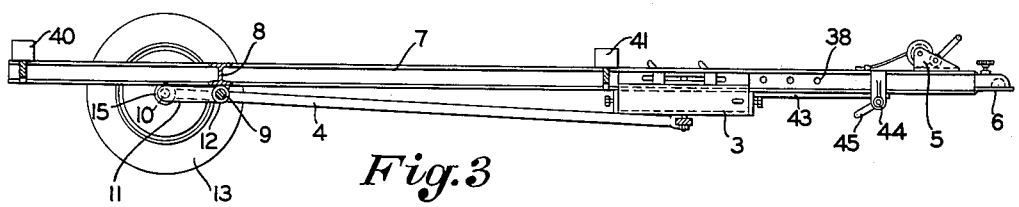
Fig. 3 is a vertical sectional view, partly in elevation, taken on the line 3—3 of Fig. 1, showing the position of the center of a wheel with respect to the mounting of the axle.
Figure 5:
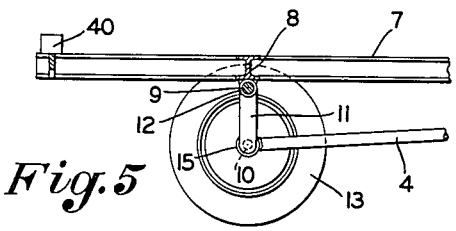
Fig. 5 is a fragmentary, vertical, sectional view, partly in elevation, showing the axle mounting at its uppermost position above the center of the wheel.

The winch 5 and its cable may also be used to achieve any other position of the axle shaft 9 with respect to the center of the wheels 13 as shown in Figs. 3 and 5. When that position shown in Fig. 3 is preferred, the winch cable may be extended around the axle or through a pulley (not shown) attached thereto, the axle being in the position of Fig. 4. The end of the cable is then pulled forward and attached to one of the eyes 42 on the suspension mechanism 3; and upon tightening the cable with the winch 5, the axle shaft 9 is drawn to the right of the center of the wheels 13 until the position shown in Fig. 3 is obtained. The mechanism 3 and the tongue-member 7 are then locked together as described above.

To achieve the position shown in Fig. 5 the cable is attached directly to the eye 42 on the mechanism 3 and the winch turned until the position in Fig. 6 is achieved. Then, the rear end of the trailer frame may be lifted slightly until the axle shaft 9 is above the center of the wheels 13. The cable may then be attached to the axle shaft 9 as was done to obtain the position of Fig. 3 and the winch operated until the axle shaft 9 is disposed directly above the center of the wheels, at which position the tongue-member 7 and the mechanism 3 may be locked together.

An alternative to the winch 5 may be used for the purpose of sliding the suspension mechanism 3 along the frame member 7. This includes a rack 43, one end of which is secured to one end of the mechanism 3 and which engages a pinion gear 44 attached to the frame member 7. The pinion gear 44 is provided with a crank handle 45. Accordingly, the suspension mechanism may be moved in either direction with respect to the tongue-member 7 in order to achieve the positions shown in Figs. 3, 4, 5 and 6. In fact, the rack 43 and the pinion gear 44 may be of sufficient size to obviate the need for the locking bolts 31 and nuts 33.

The foregoing device presents a new and novel combination of crank axle and suspension means whereby the axle may be rotated about its axis through a 360° arc, unobstructed by any part of the trailer or object to be carried by the trailer. Moreover, the fact that the suspension means is remote from the axle not only makes for the simplified construction of the axle and frame assembly, but permits the frame to be dropped to a lower position than is possible when suspension means, such as leaf springs, are disposed between the frame and the axle mounting. The offset wheel-supporting end portions or stub shafts which actually bear the load are directly connected to the suspension means at the forward part of the trailer where there is easy access for unlocking and locking in place. Finally, the connecting rods by which the axle is connected to the suspension means do not interfere with the rotational movements of the axle, because they are mounted below the frame of the trailer.

These features overcome a common difficulty with prior trailers and achieve the foregoing results in a comparatively simple and inexpensive device.

Accordingly, the present invention provides a new and different suspension construction, which incorporates the new and advantageous features described, overcome prior art difficulties, and solves longstanding problems in the art.

In the foregoing description, certain terms have been used for brevity, clearness and understanding, but no unnecessary limitations are to be implied therefrom beyond the requirements of the prior art, because such terms are utilized for descriptive purposes herein and not for the purpose of limitations and are intended to be broadly construed.

Moreover, the description of the improvements is by way of example, and the scope of the invention is not limited to the exact details illustrated and described.

Having now described the various features, discoveries and principles of the invention, the construction and operation of preferred arrangements thereof, and the advantageous, new and useful results obtained thereby; the new and useful discoveries, principles, apparatus, combinations, parts, sub-combinations, and elements, and mechanical equivalents obvious to those skilled in the art are set forth in the appended claims.

I claim:

1. A vehicle construction including a frame, at least one axle shaft rotatably mounted on the frame transversely thereof, each shaft having aligned offset wheel-supporting end portions which are rotatable through a 360° arc about the shaft, a connecting rod journally mounted at one end to one of said end portions, another connecting rod journally mounted at one end to the other of said end portions, resilient means releasably mounted on the frame at a location longitudinally spaced from the axle shaft, said means including at least one spring having a longitudinal axis substantially parallel to that of the frame, the means also including a transverse crosshead associated with said spring, the other ends of the connecting rods being secured to said crosshead, and locking means for releasably mounting the resilient means to the frame at spaced locations conforming with corresponding positions of the end portions about the shaft.

2. A vehicle construction including a frame, at least one axle shaft rotatably mounted on the frame, each shaft having aligned offset wheel-supporting end portions, a connecting rod journally mounted at one end to one of said end portions, another connecting rod journally mounted at one end to the other of said end portions, resilient suspension means slideably mounted on the frame at a location longitudinally spaced from the axle shaft, said means including an elongated housing having end walls between which are disposed a pair of aligned springs, said means also including a slide crosshead mounted between said springs, the other ends of the connecting rods being secured to said crosshead, and locking means for releasably mounting said suspension means to the frame at desired intervals and including a bolt, the frame and the housing having alignable apertures through which the bolt extends.

3. The vehicle construction of claim 2 in which the housing is provided with an elongated slot surrounded by a serrated surface, and in which the bolt is provided with a head, a nut and washer, the washer and bolt head